US012202847B2

(12) United States Patent
Tillmann et al.

(10) Patent No.: US 12,202,847 B2
(45) Date of Patent: Jan. 21, 2025

(54) METHOD FOR THE DEHYDROGENATION AND METHYLATION OF SILANES WITH METHYL CHLORIDE

(71) Applicant: Wacker Chemie AG, Munich (DE)

(72) Inventors: Jan Tillmann, Munich (DE); Richard Weidner, Burghausen (DE)

(73) Assignee: Wacker Chemie AG, Munich (DE)

( * ) Notice: Subject to any disclaimer, the term of this patent is extended or adjusted under 35 U.S.C. 154(b) by 200 days.

(21) Appl. No.: 17/917,562

(22) PCT Filed: Apr. 23, 2020

(86) PCT No.: PCT/EP2020/061367
§ 371 (c)(1),
(2) Date: Oct. 7, 2022

(87) PCT Pub. No.: WO2021/213661
PCT Pub. Date: Oct. 28, 2021

(65) Prior Publication Data

US 2023/0141781 A1 May 11, 2023

(51) Int. Cl.
*C07F 7/14* (2006.01)

(52) U.S. Cl.
CPC .................................... *C07F 7/14* (2013.01)

(58) Field of Classification Search
CPC .......... C07F 7/125; C07F 7/14; C07F 9/5407; C07F 9/5442
See application file for complete search history.

(56) References Cited

U.S. PATENT DOCUMENTS 4,985,580 A * 1/1991 Chadwick ............ C07F 7/0896 556/481
2002/0082438 A1* 6/2002 Jung ...................... C07F 7/122 556/478

FOREIGN PATENT DOCUMENTS

WO 2020048597 A1 3/2020

* cited by examiner

*Primary Examiner* — Pancham Bakshi

(57) ABSTRACT

A process for dehydrogenating and methylating silanes. The process includes providing methyl chloride that is reacted with a silane selected from the group consisting of $SiH_4$, $H_2SiMe_2$, $H_2SiMeCl$, $H_3SiMe$, $H_3SiCl$ and $HSiMe_2Cl$, in the presence of at least one ammonium and/or phosphonium salt at a temperature in the range of 70-350° C.

9 Claims, No Drawings

METHOD FOR THE DEHYDROGENATION AND METHYLATION OF SILANES WITH METHYL CHLORIDE

CROSS-REFERENCE TO RELATED APPLICATIONS

This application is a U.S. National Phase application of PCT Application NO. PCT/EP2020/061367 filed on Apr. 23, 2020 which is incorporated by reference herein in its entirety.

The present invention relates to a process for dehydrogenating and methylating silanes in the presence of at least one ammonium and/or phosphonium salt with methyl chloride (MeCl) at a temperature in the range of 70-350° C.

Methylchlorosilanes (MCSs) are employed for example in the production of silicones, for hydrophobization and in organic synthesis.

The sole way to efficiently form Me—Si bonds on a industrial scale is the Müller-Rochow process. The Müller-Rochow process proceeds from elemental silicon and simple organochlorine compounds such as MeCl.

However, the Müller-Rochow process does not enable conversion of methyl-H-silanes or H-silanes into methylated and higher methylated methylchlorosilanes (MCSs).

Processes for the chloride-catalyzed dehydrogenation of H-containing silanes are known from the literature:

US 2002/0082438 A1 describes the synthesis of organochlorosilanes proceeding from trichlorosilane, dichlorosilane or dichloromethylsilane. A further starting material used is a halogenated hydrocarbon of the formula $R^2R^3CHX$ with X=Cl or Br and $R^2$ selected from $(C_{1-17})$-alkyl, $(C_{1-10})$-fluorinated alkyl with partial or complete fluorination, $(C_{1-5})$-alkenyl, $(CH_2)_nSiMe_{3-m}Cl_m$ (with n=0–2 and m=0–3), $(CH_2)_pX$ (with p=1–9 and X=Cl or Br), or $ArCH_2X$ (with Ar=aromatic $(C_{6-14})$-hydrocarbon and X=Cl or Br), and $R^3$ is selected from H,$(C_{1-6})$-alkyl, $Ar(R')_q$ (with Ar=aromatic $(C_{6-14})$-hydrocarbon, R=$(C_{1-4})$-alkyl, halogen, alkoxy or vinyl, q=0–5). Various quaternary phosphonium halides are used as catalysts. The reaction mechanism is assumed to be a dehydrochlorination, with elimination of hydrogen chloride in all reactions.

PCT/EP2018/073933 discloses the reaction of dichlorosilane with (i) hydrogen halide or (ii) halogenated hydrocarbons of formula (I), also including methyl chloride.

It is therefore the object of the present invention to provide a process that can be used to economically produce methylchlorosilanes from H-containing silanes.

This object is achieved by a process for dehydrogenating and methylating silanes, wherein methyl chloride is reacted with a silane selected from the group consisting of $H_2SiMe_2$, $H_2SiMeCl$, $H_3SiMe$, $H_3SiCl$, $HSiMe_2Cl$, and $HSiMeCl_2$ in the presence of at least one ammonium and/or phosphonium salt at a temperature in the range of 70-350° C.

In the process according to the invention, methyl chloride (MeCl) is reacted with a silane selected from the group consisting of $SiH_4$, $H_2SiMe_2$, $H_2SiMeCl$, $H_3SiMe$, $H_3SiCl$, $HSiMe_2Cl$, and $HSiMeCl_2$ in the presence of at least one ammonium and/or phosphonium salt as catalyst.

In a first reaction step, a non-isolable intermediate is initially formed with elimination of hydrogen from the silane. This anion can either react further through formal nucleophilic substitution, or it can be inserted as silylene. In the case of the reaction with MeCl, the product is always a silane having in each case an additional methyl function and Cl function. A chloride ion is freed again in both cases, which is then available in turn as catalyst.

In the process according to the invention, the catalyst used is at least one ammonium and/or phosphonium salt. This ammonium and/or phosphonium salt may also be used in immobilized form, for example on a silicone resin, on silica, on an inorganic support or on an organic polymer. The ammonium and/or phosphonium salt may also be formed in situ from an amine or phosphine and HCl.

The ammonium and/or phosphonium salt is preferably selected from the group consisting of quaternary ammonium halides $[R_4N]X$, quaternary phosphonium halides $[R_4P]X$ and tertiary ammonium halides $[R_3NH]X$, wherein in each case:

X=Cl, Br or I, preferably Cl or Br, and

R=independently selected from the group consisting of (i) $C_1$-$C_{12}$-alkyl group, (ii) $C_6$-$C_{14}$-aryl group substituted by $C_1$-$C_6$-alkyl, and (iii) phenyl group, preferably ethyl, n-butyl, and phenyl.

Particularly preferred examples of such compounds are $[n\text{-}Bu_4N]Cl$, $[Et_4N]Cl$, $[Ph_4F]Cl$ and $[n\text{-}Bu_4P]Cl$.

The process according to the invention is typically carried out at a temperature in the range of 70-350° C., depending on the thermal stability of the catalyst. The temperature is preferably in a range of 100-350° C. For $[n\text{-}Bu_4N]Cl$, $[Et_4N]Cl$ and $[n\text{-}Bu_4P]Cl$, the temperature is particularly preferably in a range of 100-180° C., very particularly preferably, the temperature is in a range of 150-180° C.; most preferred is a temperature in a range of 170-180° C. For $[Ph_4F]Cl$, the temperature is particularly preferably in a range of 70-350° C., very particularly preferably in a range of 250-350° C.

The molar ratio of silane to MeCl may be freely selected by the person skilled in the art. Typically, the molar ratio is in a range of 1:1 to 1:10. In the case of all silanes of the group apart from $SiH_4$, the amount of MeCl added preferably corresponds to at least the stoichiometric amount of silane to be converted; the molar ratio is thus preferably 1:1 to 1:2. In the case of $SiH_4$, the amount of MeCl added preferably corresponds to at least twice the amount; the molar ratio is thus preferably 1:2 to 1:4.

The molar ratio of catalyst to silane may be freely selected by the person skilled in the art. Preferably, the molar ratio is in a range of 0.01:1 to 0.2:1.

The process according to the invention for dehydrogenating silane can be used to produce methylchlorosilanes in an economically viable manner.

EXAMPLES

GC measurements were carried out using an Agilent 6890N (WLD detector; columns: HP5 from Agilent: length: 30 m/diameter: 0.32 mm/film thickness: 0.25 μm; RTX-200 from Restek: length: 60 m/diameter: 0.32 mm/film thickness: 1 μm). Retention times were compared with the commercially available substances; all chemicals were used as purchased. MS measurements were carried out using a ThermoStar™ GSD 320 T2 with iridium cathode.

Example 1

Reactions of $SiH_4$ with MeCl

An autoclave was charged with $SiH_4$ (9 g; 0.50 mol), $[n\text{-}Bu_4F]Cl$ (2.1 g; 7 mmol) and MeCl (64.0 g; 1.27 mol). The autoclave was heated to 150° C. for 13 hours. After cooling, the pressure in the autoclave remained at approx. 30 bar. The pressure was reduced to 10 bar by decompression and then the autoclave was once again heated to 150° C. for 13 hours. After cooling, the pressure in the autoclave remained at approx. 15 bar. The autoclave was decompressed and the gas space was purged with argon. The liquid product mixture consisted to an extent of 60% by weight of $HSiMeCl_2$, 14% by weight of $MeSiCl_3$, 10% by weight of $H_2SiMeCl$, 8% by weight of $Me_2SiCl_2$, 4% by weight of MeCl and 4% by weight of other chlorine-, methyl- or/and methylene-substituted silanes. It was possible to unambiguously identify the gas formed in the reaction as hydrogen by means of mass spectrometry.

Example 2

Reactions of $SiH_4$ with MeCl

An autoclave was charged with $SiH_4$ (9 g; 0.34 mol), [n-$Bu_4$P]Cl (2.2 g; 7 mmol) and MeCl (48.0 g; 0.95 mol). The autoclave was heated to 145° C. for 13 hours. After cooling, the pressure in the autoclave remained at approx. 25 bar. The autoclave was decompressed and the gas space was purged with argon. The liquid product mixture consisted to an extent of 89% by weight of $MeSiCl_3$, 9% by weight of MeCl and 2% by weight of $Me_2SiCl_2$; in addition, small amounts of $HSiMeCl_2$ were detectable. It was possible to unambiguously identify the gas formed in the reaction as hydrogen by means of mass spectrometry.

Example 3

Reactions of $SiH_4$ with MeCl

An autoclave was charged with $SiH_4$ (7 g; 0.34 mol), [Ph4F]Cl (2.1 g; 6 mmol) and MeCl (25.0 g; 0.50 mol). The autoclave was heated to 300° C. for 13 hours. After cooling, the pressure in the autoclave remained at approx. 25 bar. The autoclave was decompressed and the gas space was purged with argon. The liquid product mixture consisted to an extent of 56% by weight of $MeSiCl_3$, 2% by weight of MeCl and 42% by weight of $Me_2SiCl_2$; in addition, small amounts of $HSiMeCl_2$ were detectable. It was possible to unambiguously identify the gas formed in the reaction as hydrogen by means of mass spectrometry.

Example 4

Reactions of a mixture of $SiH_4$ and $SiCl_4$ with MeCl

An autoclave was charged with $SiH_4$ (9 g; 0.34 mol), [n-$Bu_4$P]Cl (2.2 g; 0.7 mmol), MeCl (70.0 g; 1.38 mol) and $SiCl_4$ (50.0 g; 0.29 mol). The autoclave was heated to 190° C. for 13 hours. After cooling, the pressure in the autoclave remained at approx. 50 bar. The autoclave was decompressed and the gas space was purged with argon. The liquid product mixture consisted to an extent of 48% by weight of $SiCl_4$, 47% by weight of MeSiCl3, 3% by weight of MeCl and 2% by weight of $Me_2SiCl_2$; in addition, small amounts of $HSiMeCl_2$ and $SiCl_4$ were detectable. It was possible to unambiguously identify the gas formed in the reaction as hydrogen by means of mass spectrometry.

Example 5

Reactions of $HSiCl_2Me$ with MeCl

An autoclave was charged with $HSiCl_2Me$ (85 g; 0.75 mol), [n-$Bu_4$P]Cl (2.1 g; 7 mmol) and MeCl (50.0 g; 0.99 mol). The autoclave was heated to 130° C. for 13 hours. After cooling, the pressure in the autoclave remained at approx. 5 bar. The autoclave was decompressed and the gas space was purged with argon. The liquid product mixture consisted to an extent of 56% by weight of $HSiCl_2Me$, 31% by weight of $MeSiCl_3$, 7% by weight of $Me_2SiCl_2$, 5% by weight of MeCl and 1% by weight of other chlorine-, methyl- or/and methylene-substituted silanes. It was possible to unambiguously identify the gas formed in the reaction as hydrogen by means of mass spectrometry.

Example 6

Reactions of $HSiCl_2Me$ with MeCl

An autoclave was charged with $HSiCl_2Me$ (85 g; 0.75 mol), [n-$Bu_4$P]Cl (2.5 g; 8 mmol) and MeCl (51.0 g; 1.01 mol). The autoclave was heated to 176° C. for 13 hours. After cooling, the pressure in the autoclave remained at approx. 20 bar. The autoclave was decompressed and the gas space was purged with argon. The liquid product mixture consisted to an extent of 16% by weight of $HSiCl_2Me$, 41% by weight of $MeSiCl_3$, 33% by weight of $Me_2SiCl_2$, 9% by weight of MeCl and 1% by weight of other chlorine-, methyl- or/and methylene-substituted silanes. It was possible to unambiguously identify the gas formed in the reaction as hydrogen by means of mass spectrometry.

Example 7

Reactions of $HSiClMe_2$ with MeCl

An autoclave was charged with $HSiCl_2Me$ (85 g; 0.75 mol), [n-$Bu_4$P]Cl (2.5 g; 8 mmol) and MeCl (48.0 g; 0.95 mol). The autoclave was heated to 176° C. for 13 hours. After cooling, the pressure in the autoclave remained at approx. 30 bar. The autoclave was decompressed and the gas space was purged with argon. The liquid product mixture consisted to an extent of 16% by weight of $HSiClMe_2$, 67% by weight of $Me_2SiCl_2$, 7% by weight of $Me_3SiCl$, 9% by weight of MeCl and 1% by weight of other chlorine-, methyl- or/and methylene-substituted silanes. It was possible to unambiguously identify the gas formed in the reaction as hydrogen by means of mass spectrometry.

The invention claimed is:

1. A process for dehydrogenating and methylating silanes, comprising:

providing methyl chloride that is reacted with a silane selected from the group consisting of $SiH_4$, $H_2SiMe_2$, $H_2SiMeCl$, $H_3SiMe$, $H_3SiCl$ and $HSiMe_2Cl$, in the presence of at least one catalyst of ammonium and/or phosphonium salt at a temperature in the range of 70-350° C.

2. The process as claimed in claim 1, wherein the temperature is in a range of 100-350° C.

3. The process of claim 1, wherein the molar ratio of silane to methyl chloride is in a range of 1:1 to 1:10.

4. The process of claim 1, wherein the a molar ratio of the catalyst to silane is in a range of 0.01:1 to 0.2:1.

5. The process of claim 1, wherein the at least one catalyst of ammonium and/or phosphonium salt is selected from the group consisting of quaternary ammonium halides [$R_4$N]X, quaternary phosphonium halides [$R_4$P]X and tertiary ammonium halides [$R_3$NH]X, wherein in each case:

X=Cl, Br or I, and R=independently selected from the group consisting of (i) $C_1$-$C_{12}$-alkyl group, (ii) $C_6$-$C_{14}$-aryl group substituted by $C_1$-$C_6$-alkyl, and (iii) phenyl group.

6. The process of claim 5, wherein the at least one catalyst of ammonium and/or phosphonium salt is selected from the group consisting of [n-$Bu_4$N]CI, [$Et_4$N]CI, [$Ph_4$P]CI and [n-$Bu_4$P]Cl.

7. The process of claim 1, wherein the process is conducted continuously or batchwise.

8. A process for dehydrogenating and methylating silanes, comprising:

providing methyl chloride that is reacted with a silane selected from the group consisting of H2SiMe2, H2SiMeCl, H3SiMe, H3SiCl and HSiMe2Cl, in the presence of at least one catalyst of ammonium and/or phosphonium salt at a temperature in the range of 70-350° C.

9. A process for dehydrogenating and methylating silanes, comprising:

providing methyl chloride that is reacted with a silane selected from the group consisting of $H_2SiMe_2$, $H_2SiMeCl$, $H_3SiMe$, $H_3SiCl$ and $HSiMe_2Cl$, in the presence of at least one catalyst of an ammonium salt at a temperature in the range of 70-350° C.

* * * * *